(12) United States Patent
Basu et al.

(10) Patent No.: US 12,348,629 B2
(45) Date of Patent: Jul. 1, 2025

(54) ACKNOWLEDGEMENT-BASED KEY RETIREMENT

(71) Applicant: Arista Networks, Inc., Santa Clara, CA (US)

(72) Inventors: Sourav Basu, Bengaluru (IN); Tarun Jaswanth, Bengaluru (IN); Kaustav Majumdar, Bengaluru (IN); Manish Singhvi, Bengaluru (IN)

(73) Assignee: ARISTA NETWORKS, INC., Santa Clara, CA (US)

( * ) Notice: Subject to any disclaimer, the term of this patent is extended or adjusted under 35 U.S.C. 154(b) by 322 days.

(21) Appl. No.: 17/962,191

(22) Filed: Oct. 7, 2022

(65) Prior Publication Data

US 2024/0121087 A1    Apr. 11, 2024

(51) Int. Cl.
  *H04L 9/08* (2006.01)
(52) U.S. Cl.
  CPC ............ *H04L 9/088* (2013.01); *H04L 9/0891* (2013.01)
(58) Field of Classification Search
  CPC .............................. H04L 9/088; H04L 9/0891
  See application file for complete search history.

(56) References Cited

U.S. PATENT DOCUMENTS

| 2018/0302269 A1* | 10/2018 | Sankaran | H04L 63/162 |
| 2019/0312724 A1* | 10/2019 | Mityagin | H04L 63/068 |
| 2024/0015009 A1* | 1/2024 | Chidambara | H04L 63/162 |

OTHER PUBLICATIONS

Mick Seamanm Sep. 27, 2018, IEEE, 802.1AE-2018, IEEE Standard for Local and metropolitan area networks—Media Access Control (MAC) Security (Year: 2018).*

* cited by examiner

*Primary Examiner* — Taghi T Arani
*Assistant Examiner* — Edward Estrada
(74) *Attorney, Agent, or Firm* — Fountainhead Law Group, PC (57) ABSTRACT

Systems and methods are disclosed for acknowledgement-based retirement of expired secure association keys (SAK). A new SAK is generated by a key server. The new SAK is transmitted to members of a connectivity association (CA). The new SAK for key server ingress traffic is installed. An ingress SAK installation acknowledgement is received from the members of the CA. The new SAK for key server egress traffic is installed at the key server, based on receiving the ingress SAK installation acknowledgement from the members of the CA. A key server egress SAK installation notification is transmitted to the members of the CA A prior secure association key is retired after a configurable SAK retirement buffer delay in response to an earlier occurrence of either: receipt of an egress SAK installation acknowledgement from the members of the CA and expiration of a SAK retirement buffer delay, or expiration of a SAK retirement timeout.

20 Claims, 7 Drawing Sheets

ACKNOWLEDGEMENT-BASED KEY RETIREMENT

BACKGROUND

Encryption is an aspect of many network designs, which may be employed in order to ensure data integrity, as well as confidentiality and defense against potential threats such as replay attacks. Media Access Control security (MACsec) is a security technology that provides secure communication for application traffic on high-speed Ethernet links. MACsec is a link layer encryption for Ethernet. MACsec operates at the link speed of the ports. For network devices such as switches and routers capable of supporting multiple terabits of throughput, MACsec can provide line rate encryption for secure connections, regardless of packet size, and can scale linearly as it is distributed throughout a series of network devices.

BRIEF DESCRIPTION OF THE DRAWINGS

With respect to the discussion to follow, and in particular to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Overview

According to the Media Access Control Security (MACsec) Key Agreement (MKA) protocol, a new Secure Association Key (SAK) generation, distribution and installation in all members of a connectivity association (CA) happens in a number of steps. First the key server peer of a CA generates a new SAK. Next, members of the CA install the SAK for traffic ingress, i.e., receiving encrypted traffic. Next, the key server peer installs the SAK for egress, i.e., transmitting traffic, after receiving an acknowledgement from all non-key server members on successful installation of the SAK for their ingress or after a configurable SAK retirement timeout of initially, six seconds, whichever is earlier. Next, all other members install the SAK for egress once they receive acknowledgement from the key server peer on its successful installation of the new SAK for egress. Finally, after a configurable SAK retirement buffer delay of initially three seconds, after successful installation of the new SAK for their own egress, all peers retire the old SAK. In practice, such a configurable SAK retirement buffer delay may occur before certain hardware elements of one or more heavily loaded members of the CA have completed hardware installation of their SAK for egress. These heavily loaded members may then send a new packet that is encoded with the old SAK after its peers have already retired the old SAK that that would have been able to decode the received packet.

Accordingly, steps consistent with the present teachings are executed in a particular sequence during a rekey to avoid traffic loss. Each peer installs a SAK to handle ingress traffic before installing the SAK for handling egress traffic. Each peer in the CA continues to protect their egress traffic with the old SAK till they can install the new SAK for the egress direction of traffic flow. This means that until every member of the CA installs the new SAK for egress, all members should continue to keep the old SAK installed for the ingress direction (and not yet retire the old SAK). If the old SAK is retired completely, meaning unprogrammed in ingress direction as well, by a member before all other members have installed the new SAK for their egress, then a traffic disruption occurs. In practice, if a member of CA is slow to program the new SAK for egress then unconditional removal of the old SAK by other peers after the configurable SAK retirement timeout will cause network packet loss.

The present teachings describe using an acknowledgement-based method to retire an old SAK to avoid packet loss among members of a CA where some of the peers are slow to program their hardware. Processes consistent with the present teachings employ use of an acknowledgement-based method to retire the old SAK in the key server rather than the conventional unconditional retirement of a SAK after a delay upon installation of the egress SAK. In a CA, a key server peer will wait for all of its live peers to install the new SAK in the egress direction. A successful installation acknowledgement is received through a "SAK Use" parameter set of the MACsec Key Agreement Protocol Data Unit (MKPDUs) received from the non key server peers. Each of the non key server peers will also wait for the key server peer to retire the old SAK. The non key servers will also receive such an acknowledgement in the received "SAK Use" parameter set in the MKPDUs from the key server peer.

Further, a peer, i.e., regardless of whether a key server or not, will not retire the old SAK soon after receiving such a notification described above from other peers in the CA. Instead, each of them will wait for a further buffer time, initially three seconds, before retiring the old SAK to handle out-of-order packets. Additionally, the acknowledgement-based mechanism may cause the time to retire the old SAK to grow unboundedly. Hence, a maximum time to retire is provided, to be defined after which the old SAK may be forcefully retired without waiting for any acknowledgement.

The acknowledgement process may also be simplified for a non-key-server peer in a peer-to-peer MACsec configuration. In this scenario, the non key server peer starts installation of a SAK in the egress direction only after receiving an acknowledgment from the key server peer, i.e., the only other peer in the CA, that it has installed the new SAK in the egress direction. Hence the non-key-server peer can retire the old SAK after waiting for the buffer time, having an initial value of, for example 3 to 30 seconds, after receiving such an acknowledgement from the key-server peer. Additionally, the buffer time value may be dynamically decided based on the SAK rekey interval, which may be configured in connection with a session rekey timer which may default to, for example, 30 seconds.

Network Architecture

Figure 1:
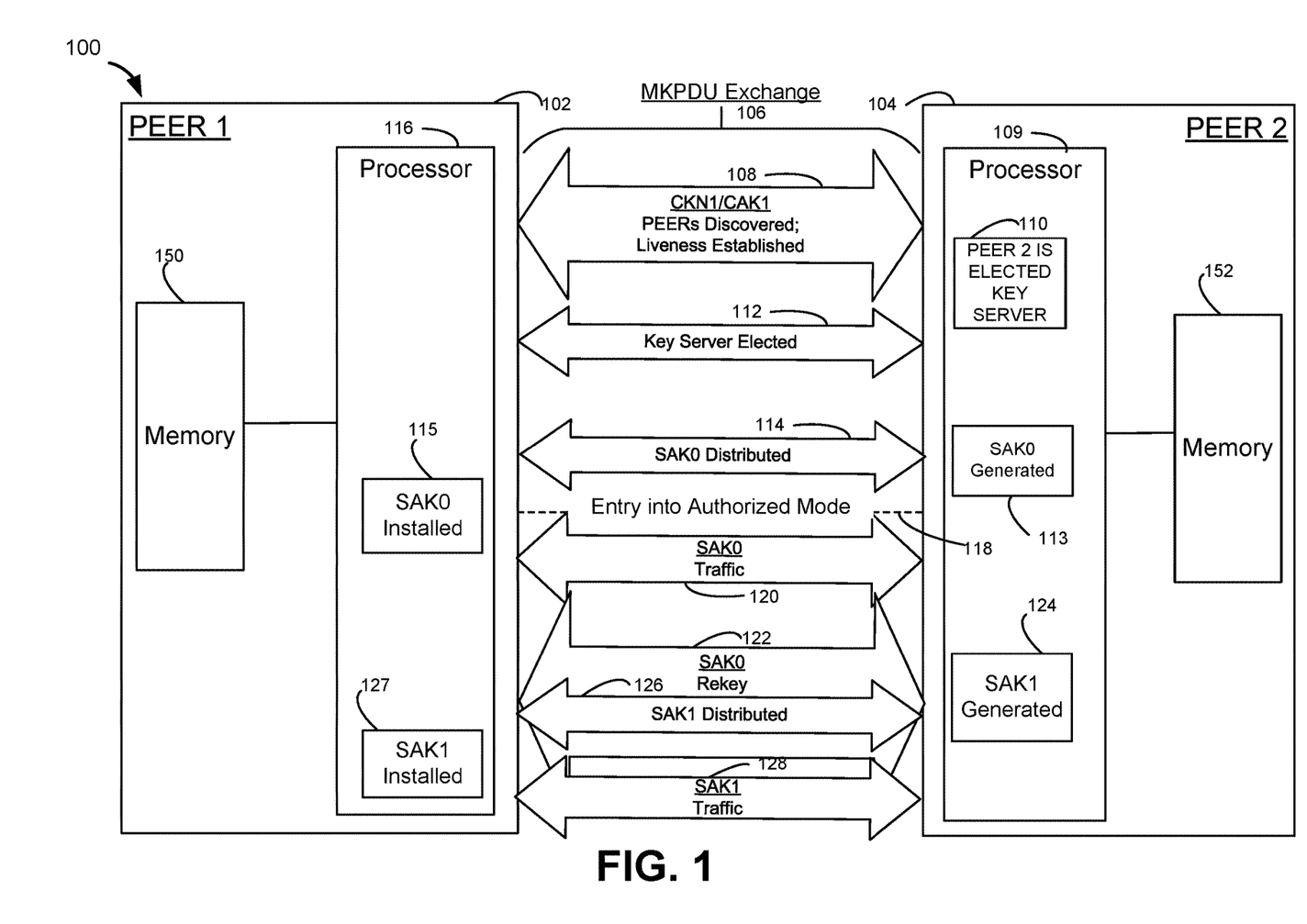
FIG. 1 illustrates an environment in which mechanisms operate for acknowledgement-based retirement of expired SAKs according to one or more embodiments.

FIG. 1 illustrates an environment 100 in which mechanisms operate for acknowledgement-based retirement of expired secure association keys according to one or more embodiments. The MACsec protocol provides data security and data integrity at Layer 2 among peer members (network devices such as switches, etc.) of a MACsec group. MACsec uses the MACsec Key Agreement (MKA) protocol to create and distribute Secure Association Keys (SAKs). SAKs are identified by association numbers (ANs) in the MACsec group. A SAK is used to encrypt/decrypt the data. Typically, a single SAK is in effect at any one time. However, when a SAK needs to be rekeyed, there will be a small window of time where two SAKs are in use for decrypting traffic during the rekey process. The AN in the SecTAG of a received MACsec data packet informs the receiving peer which SAK to use to decrypt the packet. Per the IEEE 802.1X-2010 standard, the AN is a two-bit value. So, ordinarily the key server can cycle through valid active values {0, 1, 2, 3, 0, 1, . . . } to identify a SAK.

When a rekey operation is initiated, a second SAK is generated. For a short length of time, both the first and second SAKs will be active, and so the second SAK can be associated with a different AN in order to distinguish between the first and second SAKs. FIG. 1 shows a simplified view of a system 100 according to an embodiment. In particular, a first network peer device 102 is in communication with second network peer device 104 via a MACsec protocol to exchange 106 MKPDUs. In particular, a protocol data unit (PDU) is a single unit of information transmitted among peer entities of a computer network. A PDU is composed of protocol-specific control information and user data. FIG. 1 is simplified for the purposes of illustration, in that separate transmission (Tx) and receipt (Rx) communications are used to exchange information. The MKPDUs exchanged are the PDU packets that every MACsec enabled interface sends to its peers. When MKPDU is not received after 3 heartbeats (each heartbeat being 2 seconds), peers are considered to be disconnected.

As part of initial operation 108, various peers are discovered, and liveness between network peers is established. Such an initial operation may rely upon a first Connectivity Association Key Name (CKN1) and a first Connectivity Association Key (CAK1). Communication using MACsec requires one peer in the MACsec group to be elected as the key server. Election of the key server is based on the values of the key server priorities of each of the respective peers in the MACsec group. Each participant in an MKA instance uses the key server priority (an 8-bit integer) encoded in each MKPDU to agree on a key server. In a given CA, each participant advertises their priority to become key server and the peer with numerically lowest value of priority is chosen to be the key server. In the event of a priority tie for the key server, the MACsec group member with the highest priority Secure Channel Identifier (SCI) may be chosen. To ensure consistency with uses of the SCI's MAC address component other than as a tiebreaker for priority, numerically lower values of the key server priority and SCI are accorded the highest priority. Setting a peer's key server priority to the highest priority, can ensure that peer's election 112 to be the key server.

In the example illustrated in connection with FIG. 1, second network peer device 104 is elected key server 110. Second network peer device 104 includes processor 109, which is communicatively coupled with memory 152. When the first SAK is generated 113, the peer can assign any AN to the SAK. The initial SAK, say SAK0 can then be distributed 114 and installed 115 on the first network peer by processor 116, which is communicatively coupled with memory 150. When MACsec is enabled on an interface, the interface moves into an unauthorized mode dropping all frames and accepting only MKA packets. In this unauthorized mode, the interface is not considered to be a part of any topology. The interface continues in this manner until the MACsec Key Agreement (MKA) procedures are complete. Once an MKA handshake is done and SAK is distributed and programmed for Rx/Tx the interface enters an authorized mode 118. Authorized mode permits all packets which pass the integrity and encryption check on that interface to be communicated as traffic 120.

It is recognized that prolonged utilization of the same SAK for encryption and decryption can increase the chances of compromising SAK leading to security vulnerabilities. Accordingly, MACsec employs a periodic rekey operation 122 in order to change the SAK between network peers. When a rekey operation is initiated, a second SAK, say SAK1 is generated at 124 by the key server. That second SAK is distributed 126 via MKPDUs and installed 127. As shown in FIG. 1, for some length of time both the first and second SAKs will be active for handling ingress traffic, until the first SAK is retired as further described in connection with FIG. 2A below. The second SAK can be associated with a different AN in order to distinguish between the first and second SAKs. That second SAK having the different AN value is then used to communicate traffic 128 between the network peers. Eventually, when the next (third) SAK is generated (e.g., as a result of another rekey operation), the assigned AN cycles to a different value. In some embodiments, the number increments until it reaches a maximum value and then returns to 0.

Figure 2A:
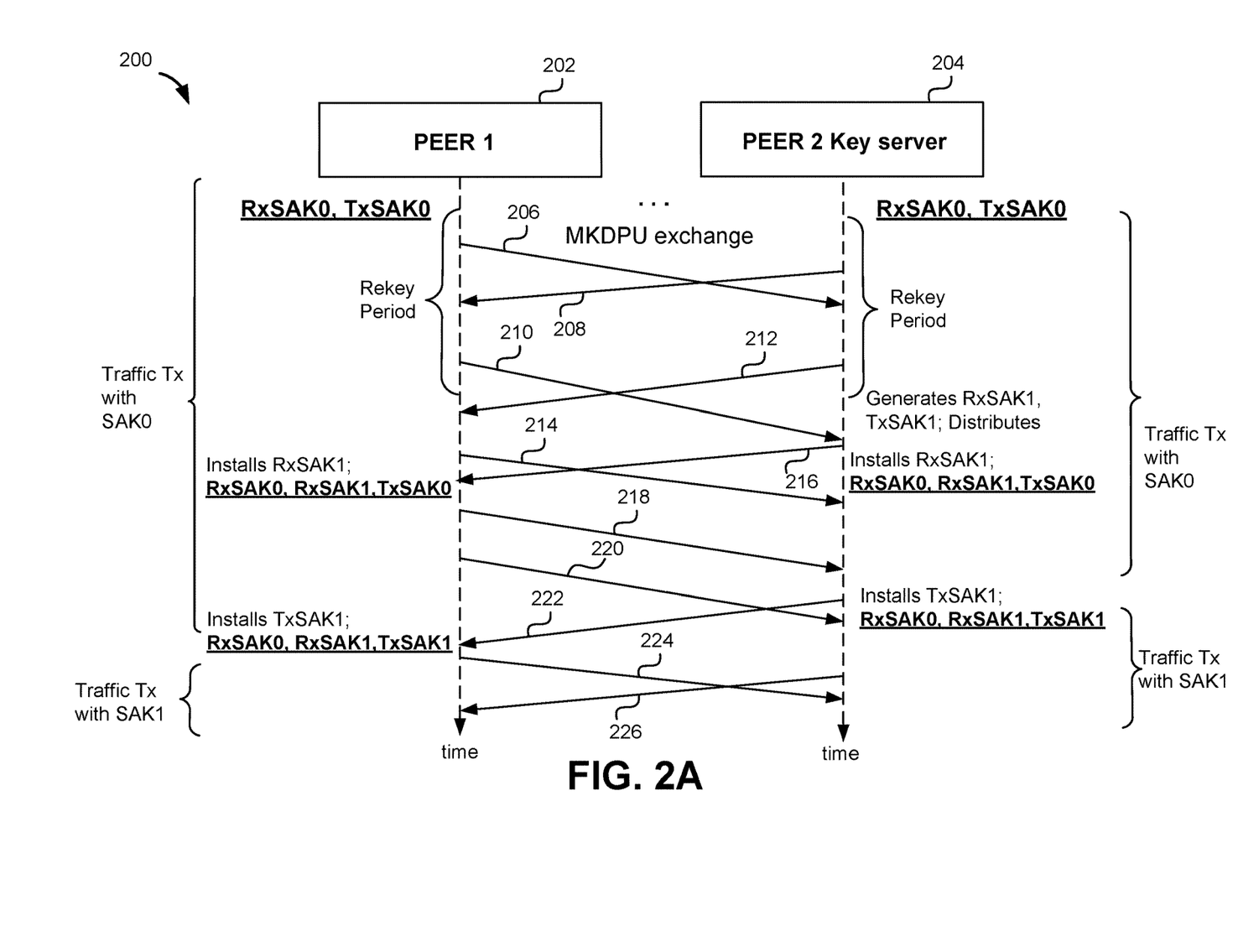
FIGS. 2A and 2B illustrate example flows corresponding to acknowledgement-based retirement of expired SAKs according to one or more embodiments.

FIG. 2A illustrates an example flow 200 corresponding to acknowledgement-based retirement of expired secure association keys according to one or more embodiments. In connection with FIG. 2A, first peer 202 is a non key server, and second peer 204 is a key server. As part of an illustrated MKPDU exchange, various PDUs are exchanged between first peer 202 and second peer 204 in order to exchange and install new SAKs for both ingress (receiving) as well as egress (transmitting) data packets. The first set of exchanges occur during a rekey period as shown in connection with FIG. 2A. At a start of the rekey period, both peers are using ingress SAK0 and egress SAK0 to communicate to encrypt packets in transit. In connection with transmission 206, first peer 202 sends a packet to second peer 204 using SAK0. In connection with transmission 208, second peer 204 sends a packet to first peer 202 using SAK0. Transmissions 210 and 212 proceed similarly. Next, second peer 204 generates both egress and ingress SAK1 and distributes it to all of the peers in the CA. After distribution, second peer 204 installs ingress SAK1. Once first peer 202 receives the SAK1 for receiving data, first peer 202 installs the ingress SAK1, and first peer 202 continues to transmit using egress SAK0 and first peer 202 can receive packets encrypted with both ingress SAK0 and ingress SAK1. Therefore, both transmissions 214 and 216 are encrypted using SAK0. The same is true for transmissions 218 and 220.

Next, second peer 204 installs egress SAK1 and begins encrypting transmissions with SAK1. Transmission 222 is, therefore, encrypted and sent with SAK1, and first peer 202 decrypts transmission 222 with SAK1. Next, first peer 202 installs egress SAK1 and encrypts transmission 224 with SAK1. In some embodiments non key server peers install new SAKs upon receipt. Transmission 226 is then encrypted with SAK1 and transmitted. In some embodiments, ingress SAK0 is retired by first peer 202 once first peer 202 receives one or more packets that are encrypted with SAK1. In these embodiments, first peer 202 sends an acknowledgement to the key server once it has received and installed ingress SAK1, so that the key server receives information that first peer 202 has installed ingress SAK1. In some such embodiments, once the key server receives acknowledgements from all peers in the CA that ingress SAK1 has been installed, the key server may retire egress SAK0.

Figure 2B:
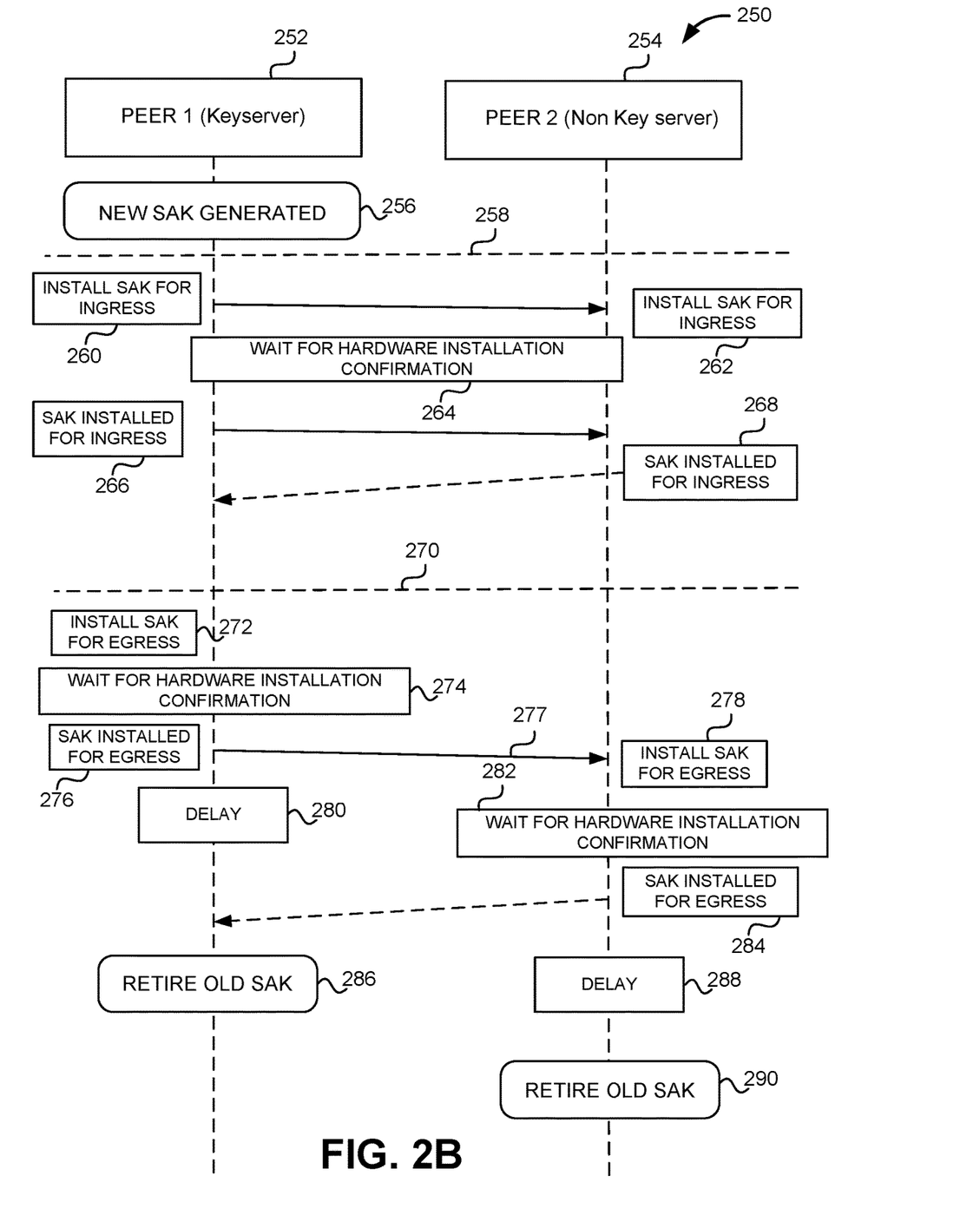

FIG. 2B illustrates another example flow 250 corresponding to acknowledgement-based retirement of expired secure association keys according to one or more embodiments. In this example, first peer 252 is a key server and second peer 245 is a non key server. At stage 256, a new SAK is generated. This new SAK may be designated with any AN as described above. In some embodiments the new SAK will receive an AN that has a value of the current SAK incremented modulo the maximum AN value used by the key server, which is to say that if the current SAK is equal to the maximum AN the new SAK will be equal to 0.

Next, at stage 258 a process is initiated to install the new SAK for ingress traffic. At stage 260, the new SAK is installed by first peer 252, and a MKPDU is sent to distribute the new SAK to non key servers, including second peer 254. Upon receipt of the distributed new SAK by second peer 254, second peer 254 installs the new SAK for ingress at stage 262. In some embodiments, the act of installing the new SAK involves providing the new SAK to a hardware platform associated with the control plane of second peer 254. Depending on data processing load of the control plane of second peer 254, this instruction may take from a few milliseconds to a few thousand milliseconds. In these embodiments, at stage 264, first peer 252 and second peer 254 wait for a confirmation that their underlying hardware has successfully installed the new SAK. Installing a new SAK into hardware associated with a network device may be an asynchronous process whereby a control plane sends a message or updates a state associated with encryption hardware to install a new encryption key. Once the underlying hardware has successfully installed the new encryption key, the hardware may reply with a message of installation confirmation or otherwise update state indicating that the new encryption key has been installed into the underlying hardware platform. Next at stage 266, once first peer 252 confirms that it has installed the new SAK, it sends a message to its peers that it has successfully installed the new SAK for ingress. Similarly, at stage 268, second peer 254 sends a message that it has successfully installed the new SAK for ingress.

At stage 270, a process (described below starting at stage 272) is initiated to install the new SAK for egress traffic. In some embodiments, this involves the key server, first peer 252, installing the new SAK for egress traffic after receiving an acknowledgement from all other members of the CA that the other members have successfully installed the new SAK for their ingress or after a peer ingress install delay of, for example 6 seconds. Such a peer ingress install delay may be considered a buffer time to allow time for other peers to install the new SAKs for their ingress. In some such embodiments the peer ingress install delay may be a longer or shorter time. The peer egress install delay may also be determined dynamically based on an amount of time it has taken for the members of the CA to install past SAKs. In these embodiments, SAK installation for egress on non key servers is not started until SAKs for ingress are installed on all of the live peers in the CA (the process described in connection with stage 258 above), which is indicated by the key server's SAK installation for egress.

At stage 272, first peer 252 installs its SAK for egress by providing an instruction to its control plane to begin hardware installation of the SAK. Next, at stage 274, first peer 252 waits for its hardware to install the SAK, i.e., at stage 274, the process waits for a hardware installation confirmation at the control plane within first peer 252. Once the hardware installation confirmation is received, at stage 276, the SAK is installed for egress for first peer 252. At stage 277, first peer 252 transmits, to each of the members of the CA, a key server egress SAK installation notification, upon installing the new SAK for key server egress traffic. At stage 278, second peer 254 installs its SAK for egress. First peer 252 enters a conditional configurable SAK retirement buffer delay before retiring the old SAK. An associated condition is that second peer 254 (and any other non-key server peers) sends an egress installed acknowledgement indicating that second peer 254 has successfully installed the new SAK for egress. Next, at stage 282, second peer 254 waits asynchronously for its hardware to provide confirmation that it has successfully installed its SAK for egress.

At stage 284, second peer 254 sends an egress installed acknowledgement indicating that second peer 254 has successfully installed the new SAK for egress. Once installed, second peer 254 begins transmitting packets encrypted with the new SAK, and at stage 288 enters into a conditional configurable SAK retirement buffer delay similar to that of first peer 252. In some embodiments the SAK retirement buffer delay is initially 3 seconds, however, the configurable SAK retirement buffer delay for all peers may be a shorter or longer time period, such as, for example a few milliseconds to a few hundreds of milliseconds to 5, 10, 15, or 30 seconds. The configurable SAK retirement buffer delay may also be dynamic based on prior experience of packet loss where, for example, a packet is received that cannot be decrypted as presumably having been encrypted with a retired SAK. Thereafter, at stage 286, first peer 252 retires its old SAKs. After the configurable SAK retirement buffer delay of stage 288, at stage 290, second peer 254 retires associated expired SAKs. In some embodiments, first peer 252 may send a SAK retirement notification. In some other cases, second peer 254 (and other non key peers) retire corresponding expired SAKs when the key server starts transmitting packets encrypted with the new SAK. In yet other embodiments, non key peers retire the expired SAKs after an additional non key peer SAK retirement buffer delay after the key server starts transmitting packets encrypted with the new SAK. Such a non key peer SAK retirement buffer delay may be approximately three seconds, but this buffer delay may be shorter or longer, such as, for example, one second or as long as 5, 10, 15, 20, or 30 seconds.

Figure 3A:
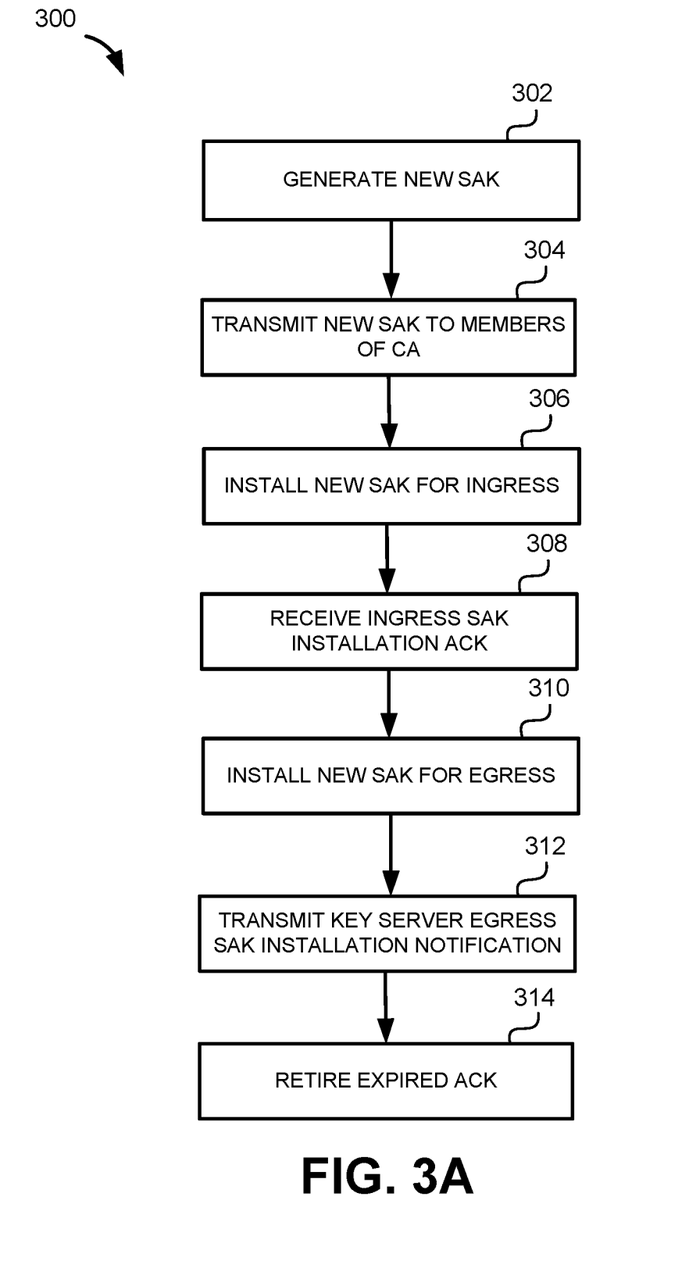
FIGS. 3A and 3B illustrate example methods for acknowledgement-based retirement of expired SAKs according to one or more embodiments.

FIG. 3A illustrates an example method 300 for acknowledgement-based retirement of expired SAKs according to one or more embodiments. In some embodiments, methods and systems for acknowledgement-based retirement of expired SAKs are provided from the perspective of a key server. At step 302, a key server may generate a new SAK. At step 304, the new SAK is transmitted to members of a connectivity association. At step 306, the key server may install the new SAK for ingress and provide a notification to each of the members of a CA that the peer members may install the new SAK for their ingress traffic.

At step 308, an ingress SAK installation acknowledgement may be received from each of the members of the CA indicating successful installation of the new SAK for member ingress traffic. At step 310, the new secure association key is installed at the key server for key server egress traffic. Next, at step 312, a key server egress SAK installation notification is transmitted to each of the members of the connectivity association. At step 314 prior SAKs may be conditionally retired by the key server after various conditions have been satisfied. In some embodiments, after all egress SAK installation acknowledgements have been received from each of the members of the CA, an additional SAK retirement buffer delay is taken into consideration, to address, for example a situation in which packets are sent and/or received out of order. In this way waiting to retire an expired SAK for a time period will allow the key server to still have the unretired SAK and therefore be able to decrypt corresponding incoming packets. In some embodiments the additional SAK retirement buffer delay is about three seconds. The additional SAK retirement buffer delay may be a shorter or longer time period, ranging from a few milliseconds to hundreds of seconds, depending on an amount of time that an out of order packet can be expected to be delayed. The additional SAK retirement buffer delay may be configurable in connection with the configuration of a network device. As with other configurable parameters consistent with the present teachings the additional SAK retirement buffer delay may also be dynamically adjusted according to real-world conditions experienced by a particular network device.

It is understood that such an acknowledgement-based mechanism may cause a delay in retiring an expired SAK to grow unboundedly. Hence, in some embodiments a configurable maximum time to retire (configurable SAK retirement timeout) may be defined after which an expired SAK may be forcefully retired without waiting for any acknowledgement. In some embodiments, a corresponding default value may be dynamically set based on a configured session rekey timer, such as, for example, 30 seconds.

Figure 3B:
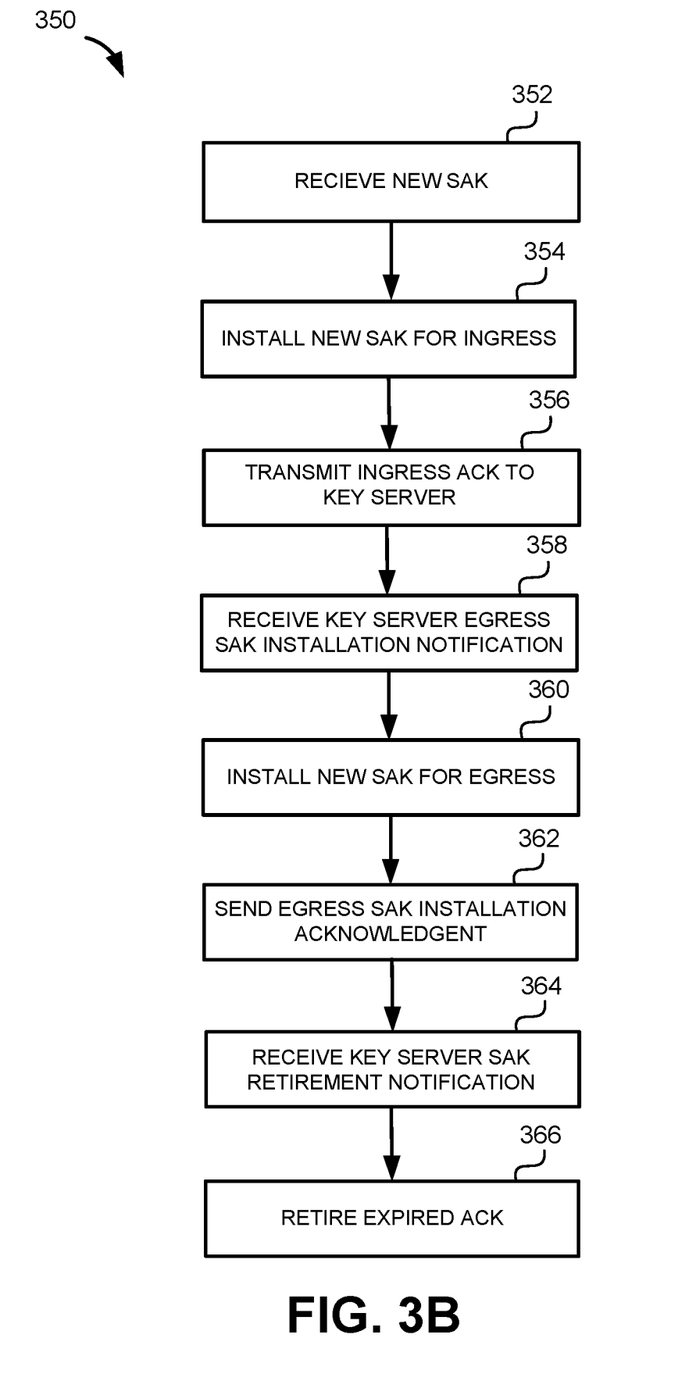

FIG. 3B illustrates another example method 350 for acknowledgement-based retirement of expired SAKs according to one or more embodiments. In some embodiments, methods and systems for acknowledgement-based retirement of expired SAKs are provided from the perspective of a non key server. At step 352, A new secure association key is received from a key server. At step 354, the new SAK for peer ingress traffic is installed by a member network device. At step 356, an ingress SAK installation acknowledgement is transmitted to the key server indicating successful installation of the new SAK for member ingress traffic. Next, at step 358, a key server egress SAK installation notification is received from the key server, providing notification that the key server has installed the new SAK for key server egress traffic. At step 360, the new SAK is installed by the member network device for peer egress traffic. At step 362, each member network device sends egress SAK installation acknowledgement to the key server, providing an indication that the member network device has installed the new SAK for peer egress traffic. At step 364, a SAK retirement notification is received from the key server, providing notification that the key server has retired the expired SAK. Finally, at step 366, the expired SAK is retired after receiving the SAK retirement notification from the key server. In some embodiments, the expired SAK is retired based on various conditions. The conditions include, for example, waiting for expiration of a configurable SAK retirement buffer delay after a key server egress SAK installation notification. Alternatively, the configurable SAK retirement buffer delay is determined dynamically based on a previous out-of-order packet time delay associated with out-of-order packets received at the member network device. In other embodiments, retiring the expired SAK is further based on expiration of a configurable SAK retirement timeout.

Each of the non key server member network devices may also wait for the key server peer to retire an expired SAK. The non key servers will also receive such an acknowledgement in the received "SAK Use" parameter set in the MKPDUs from the key server peer. Further, in some embodiments non key server member network devices may not retire an expired SAK after receiving such a notification as set forth above from the key server or other peers in a particular CA. Instead, each of them will wait for a further configurable buffer time, which may be dynamic and initially set to three seconds, before retiring expired SAKs to handle out-of-order packets.

Example Network Device

Figure 4:
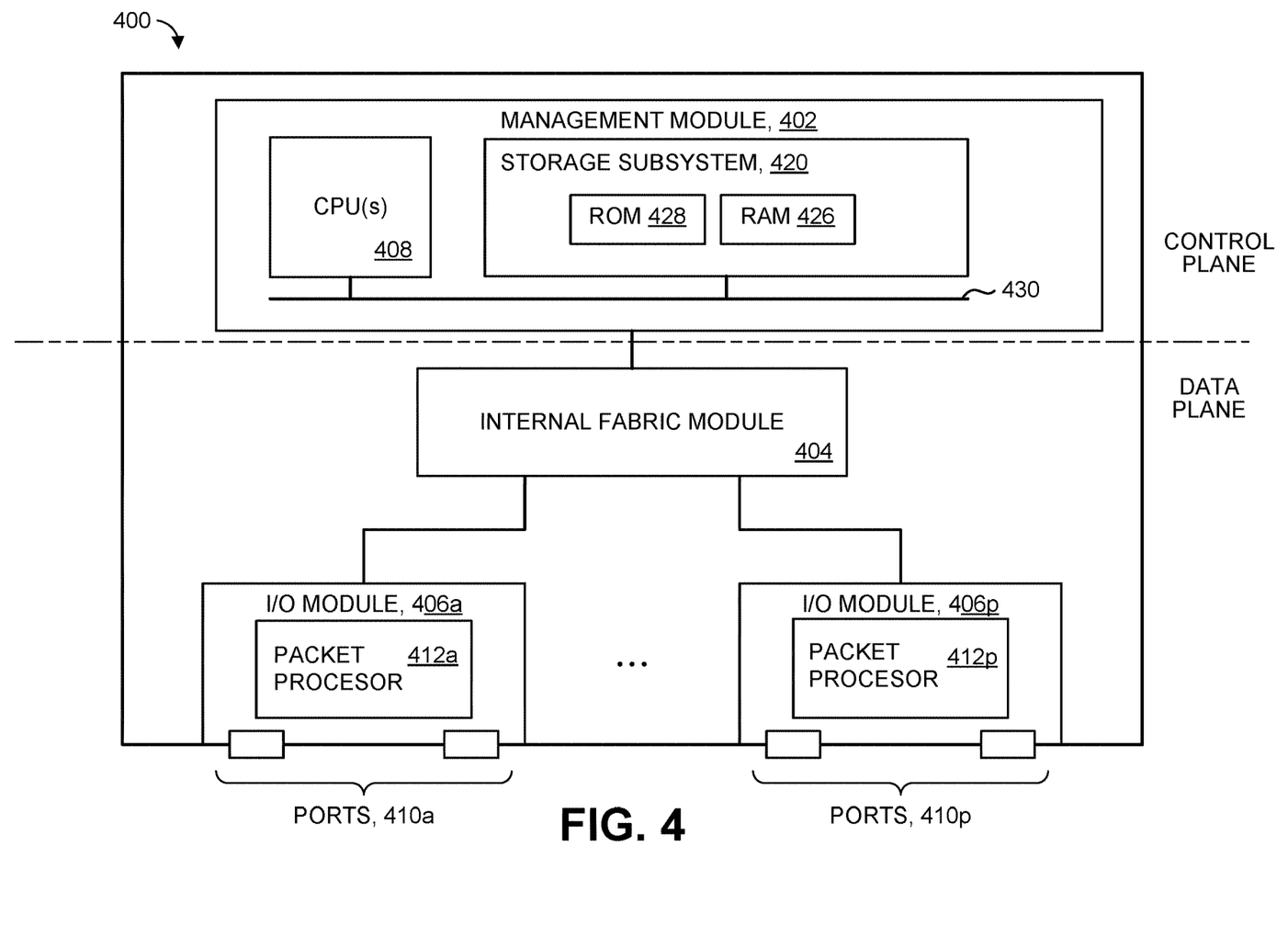
FIG. 4 illustrates an example of a network device that can be adapted in accordance with one or more embodiments.

FIG. 4 illustrates an example network device 400 that can be adapted in accordance with some embodiments of the present disclosure. Network device 400 may be a device or a router, for example. As shown, network device 400 may include management module 402, internal fabric module 404, and a number of I/O modules 406a-406p. Management module 402 may be disposed in a control plane (also referred to as control layer) of the network device 400 and can include one or more management CPUs 408 for managing and controlling operation of network device 400 in accordance with the present disclosure. Management CPU(s) 408 may be general-purpose processors, such as an Intel®/AMD® x86-64 or ARM® processor, that operates under the control of software stored in a memory, such as storage subsystem 420, which may include read-only memory (ROM) 428 and/or random-access memory (RAM) 426. The control plane refers to all the functions and processes that determine which path to use, such as routing protocols, spanning tree, and the like.

Internal fabric module 404 and I/O modules 406a to 406p collectively represent a data plane of network device 400 (also referred to as data layer, forwarding plane, etc.). Internal fabric module 404 is configured to interconnect the various other modules of network device 400. Each I/O module 406a to 406p includes one or more input/output ports 410a to 410p that are used by network device 400 to send and receive network packets. Each I/O module 406a to 406p can also include a packet processor 412a to 412p. Each packet processor 412a to 412p may comprise a forwarding hardware component configured to make wire speed decisions on how to handle incoming (ingress) and outgoing (egress) network packets. In some embodiments, the forwarding hardware can comprise an application specific integrated circuit (ASIC), a field programmable array (FPGA), a digital processing unit, or other such collection of configured logic.

Example Host Device

Figure 5:
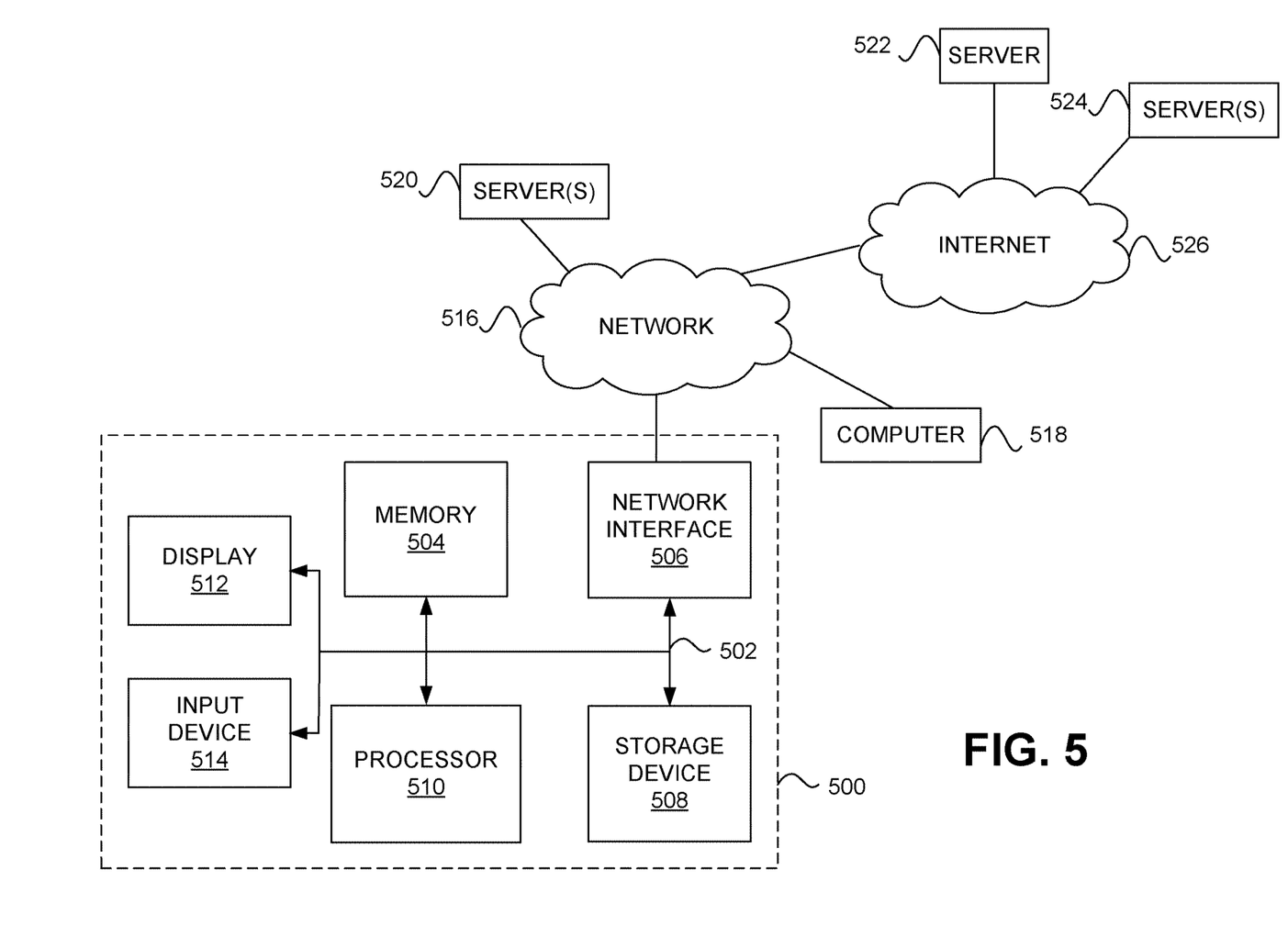
FIG. 5 illustrates an exemplary host hardware platform according to one or more embodiments.

FIG. 5 illustrates an exemplary hardware platform according to one or more embodiments. Computer 500 can be a desktop computer, a laptop computer, a server computer, a mobile device such as a smartphone or tablet, or any other form factor of general- or special-purpose computing device containing at least one processor. Depicted with computer 500 are several components, for illustrative purposes. Certain components may be arranged differently or be absent.

Additional components may also be present. Included in computer 500 is system bus 502, via which other components of computer 500 can communicate with each other. In certain embodiments, there may be multiple busses or components that may communicate with each other directly. Connected to system bus 502 is processor 510. Also attached to system bus 502 is memory 504. Also attached to system bus 502 is display 512. In some embodiments, a graphics card providing an input to display 512 may not be a physically separate card, but rather may be integrated into a motherboard or processor 510. The graphics card may have a separate graphics-processing unit (GPU), which can be used for graphics processing or for general purpose computing (GPGPU). The graphics card may contain GPU memory. In some embodiments no display is present, while in others it is integrated into computer 500. Similarly, peripherals such as input device 514 is connected to system bus 502. Like display 512, these peripherals may be integrated into computer 500 or absent. Also connected to system bus 502 is storage device 508, which may be any form of computer-readable media, such as non-transitory computer readable media, and may be internally installed in computer 500 or externally and removably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface 506 is also attached to system bus 502 and allows computer 500 to communicate over a network such as network 516. Network interface 506 can be any form of network interface known in the art, such as Ethernet, ATM, fiber, Bluetooth, or Wi-Fi (i.e., the Institute of Electrical and Electronics Engineers (IEEE) 802.11 family of standards). Network interface 506 connects computer 500 to network 516, which may also include one or more other computers, such as computer 518, and network storage, such as cloud network storage. Network 516 is in turn connected to public Internet 526, which connects many networks globally. In some embodiments, computer 500 can itself be directly connected to public Internet 526.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers.

A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random-access memory associated with one or more physical processor cores.

Many different arrangements of the various components depicted, as well as components not shown, are possible without departing from the scope of the claims below. Embodiments of the disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims. Although the present teachings have been described with reference to the embodiments illustrated in the attached drawing figures, it is noted that equivalents may be employed, and substitutions made herein without departing from the scope of the present teachings as recited in the claims. The subject matter of the present disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the present claims. Terms should not be interpreted as implying any particular ordering of various steps described unless the order of individual steps is explicitly described.

The following detailed description of embodiments references the accompanying drawings that illustrate specific embodiments in which the present teachings can be practiced. The described embodiments are intended to illustrate aspects of the present teachings in sufficient detail to enable those skilled in the art to make use of the present teachings. Other embodiments can be utilized, and changes can be made without departing from the claimed scope of the present teachings. The following detailed description is, therefore, not to be taken in a limiting sense. The scope of embodiments is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Having thus described various embodiments of the disclosure, what is claimed as new and desired to be protected by Letters Patent includes the following:

1. A computer-implemented method for acknowledgement-based retirement of expired secure association keys (SAK), the method comprising:
   generating, by a key server, a new SAK;
   transmitting the new SAK to members of a connectivity association (CA);
   installing, at the key server, the new SAK for key server ingress traffic;
   receiving an ingress SAK installation acknowledgement from each of the members of the CA indicating successful installation of the new SAK for member ingress traffic;
   installing, at the key server, the new SAK for key server egress traffic, based on receiving the ingress SAK installation acknowledgement from each of the members of the CA;
   transmitting, to each of the members of the CA, a key server egress SAK installation notification, based on installing the new SAK for key server egress traffic;
   retiring a prior SAK in response to an earlier occurrence of either:
     expiration of a configurable SAK retirement buffer delay time period, the configurable SAK retirement buffer delay time period to start after the key server receives an egress SAK installation acknowledgement from each of the members of the CA, or
     expiration of a configurable SAK retirement timeout.

2. The method of claim 1, wherein the configurable SAK retirement timeout is dynamically adjusted based on previous receipt of the egress SAK installation acknowledgement from prior members of the CA.

3. The method of claim 1, wherein the configurable SAK retirement buffer delay is determined dynamically based on a previous out-of-order packet time delay associated with out-of-order packets received at the key server.

4. The method of claim 1, wherein the prior SAK is deleted if the key server does not receive the egress SAK installation acknowledgement from each of the members of the CA prior to the expiration of a configurable SAK retirement timeout.

5. The method of claim 1, wherein the configurable SAK retirement timeout is forty-five seconds and the configurable SAK retirement buffer delay is ten seconds.

6. The method of claim 1, further comprising:
   receiving subsequent receive network packets from the members of the CA; and
   decoding the subsequent receive network packets with the new SAK.

7. The method of claim 1, further comprising:
   encoding subsequent versions of new transmit network packets with the new SAK; and
   transmitting the subsequent versions of the new transmit network packets to the members of the CA.

8. One or more non-transitory computer-readable media storing computer-executable instructions that, when executed by a processor, perform a method of acknowledgement-based retirement of expired secure association keys (SAK), the method comprising:
   generating, by a key server, a new SAK;
   transmitting the new SAK to members of a connectivity association (CA);
   installing, at the key server, the new SAK for key server ingress traffic;
   receiving an ingress SAK installation acknowledgement from each of the members of the CA indicating successful installation of the new SAK for member ingress traffic;
   installing, at the key server, the new SAK for key server egress traffic, based on receiving the ingress SAK installation acknowledgement from each of the members of the CA;
   transmitting, to each of the members of the CA, a key server egress SAK installation notification, based on installing the new SAK for key server egress traffic;
   retiring a prior SAK in response to an earlier occurrence of either:
     receipt of an egress SAK installation acknowledgement from each of the members of the CA, or expiration of a configurable SAK retirement timeout.

9. The one or more non-transitory computer-readable media of claim 8, further includes waiting for expiration of a configurable SAK retirement buffer delay after receipt of the egress SAK installation acknowledgement from each of the members of the CA.

10. The one or more non-transitory computer-readable media of claim 9, wherein the configurable SAK retirement buffer delay is determined dynamically based a previous out-of-order packet time delay associated with out-of-order packets received at the key server.

11. The one or more non-transitory computer-readable media of claim 8, wherein the prior SAK is deleted if the key server does not receive the egress SAK installation acknowledgement from each of the members of the CA prior to the expiration of a configurable SAK retirement timeout.

12. The one or more non-transitory computer-readable media of claim 8, the method further comprising:
   encoding subsequent versions of new transmit network packets with the new SAK; and
   transmitting the subsequent versions of the new transmit network packets to the members of the connectivity association.

13. The one or more non-transitory computer-readable media of claim 8, the method further comprising:
   receiving subsequent network packets from the members of the CA; and
   decoding new network packets with the new SAK.

14. The one or more non-transitory computer-readable media of claim 8, wherein the method further comprises:
   encoding subsequent network packets with the prior SAK; and transmitting the subsequent network packets to the members of the CA prior to retirement of the prior SAK.

15. A member network device employing acknowledgement-based retirement of expired secure association keys (SAK), the network device comprising:
- a processor associated with a control plane of the network device; and
- one or more non-transitory computer-readable media storing computer-executable instructions that, when executed by the processor, perform a method comprising:
  - receiving, from a key server, a new secure association key;
  - installing, at the member network device, the new SAK for peer ingress traffic;
  - transmitting, to the key server, an ingress SAK installation acknowledgement indicating successful installation of the new SAK for member ingress traffic;
  - receiving from the key server, a key server egress SAK installation notification, providing notification that the key server has installed the new SAK for key server egress traffic;
  - installing, at the member network device, the new SAK for peer egress traffic; and
  - retiring the expired SAK, based on receiving from the key server, a SAK retirement notification, providing notification that the key server has retired the expired SAK.

16. The member network device of claim 15, wherein the method further comprises waiting for expiration of a configurable SAK retirement buffer delay after receiving the key server egress SAK installation notification.

17. The member network device of claim 16, wherein the configurable SAK retirement buffer delay is determined dynamically based on a previous out-of-order packet time delay associated with out-of-order packets received at the member network device.

18. The member network device of claim 15, wherein the expired SAK is retired if the key server does not receive an egress SAK installation acknowledgement from each of the members of a connectivity association (CA) prior to the expiration of a configurable SAK retirement timeout.

19. The member network device of claim 18, wherein the method further comprises:
- encoding subsequent network packets with a prior secure association key; and
- transmitting the subsequent network packets to the members of a connectivity association (CA).

20. The member network device of claim 15, wherein the method further comprises:
- receiving subsequent network packets from members of a connectivity association (CA); and
- decoding new network packets with the new secure association key.

* * * * *